United States Patent Office 3,401,222
Patented Sept. 10, 1968

3,401,222
NEMATOCIDAL 2,4 - DIHALOPHENYL ESTERS
OF ETHANESULFONIC ACID ETHERS AND
ALCOHOLS
George R. Haynes, Modesto, Calif., assignor to Shell Oil
Company, New York, N.Y., a corporation of Delaware
No Drawing. Filed July 29, 1965, Ser. No. 475,842
9 Claims. (Cl. 424—278)

ABSTRACT OF THE DISCLOSURE 2,4-dihalophenyl esters of the ethanesulfonic acid ethers and alcohols useful as nematocides.

---

This invention relates to a novel class of aromatic esters of substituted ethanesulfonic acids of particular configuration, and to their use as nematocides.

To control root infesting nematodes with conventional nemotocides the farmer generally has to apply large quantities of the active ingredient per acre. Quantities up to 20 gallons per acre are frequently required for nematode control. Use of such large quantities requires specialized application equipment. Further, most of the currently employed chemicals are highly volatile and require proper placement in the soil. In addition most of the popular nematocides are quite phytotoxic and the soil must be aerated for several days after their use. This practice places a severe limitation on the types of crops upon which such nematocides can be used. In general, the use of nematocides has been restricted to high value crops.

It is an object of this invention to provide effective yet inexpensive chemicals which can be used in relatively small quantities to control root-infesting nematodes. It is a further object to provide a class of compounds which will be residual in the soil—that is, continue to control nematodes and not adversely affect plant growth. Yet another object of the invention is to provide a class of nematocides which may be applied to soil around growing crops.

In accordance with this invention, it has been found that the 2,4-dihalophenyl esters of ethanesulfonic acid in which the ethyl moiety is substituted on the beta carbon atom by an oxygen-containing functional group via an oxygen atom of that group, are highly effective nematocides. This high nematocide activity is retained for long periods of time even in a soil environment. Further, these compounds have been found to essentially non-toxic to plants and seeds at nematocidally effective dosages, so that they can be used to control nematodes in the soil in which plants are growing, or can be used to eradicate nematodes from soil immediately prior to planting seeds or plants therein, without risk of injury to the plants by the nematocide.

The esters of this invention are represented by the formula:

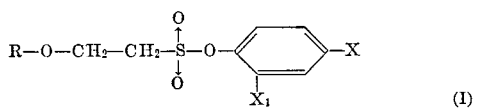

wherein R represents hydrogen, alkyl of from one to six carbon atoms, alkenyl of up to six carbon atoms, hydroxyalkyl of from one to six carbon atoms, alkanoyl of from two to six carbon atoms, alkoxyalkyl of from two to six carbon atoms, or unsubstituted dioxolanylalkyl wherein the alkyl is 1 to 4 carbon atoms, both X and $X_1$ represent chlorine, bromine, or flourine and X and $X_1$ may be the same or may be different.

The moiety, R, may be straight-chain or branded chain in configuration.

Suitable oxygen heterocycles include furyl, dioxyl, pyranyl, and dioxadienyl, which may be linked with the ethanesulfonic acid portion of the molecule via the oxygen atom and an alkylene group up to four carbon atoms.

Typical examples of compounds of the described class, useful in accordance with the present invention, are the following:

2,4-dichlorophenyl 2-ethoxyethanesulfonate
2,4-dichlorophenyl 2-propoxyethanesulfonate
2,4-dichlorophenyl 2-butoxyethanesulfonate
2,4-dichlorophenyl 2-((2-hydroxy)ethoxy)ethanesulfonate
2,4-dichlorophenyl 2-((3-hydroxy)propoxy)ethanesulfonate
2,4-dibromophenyl 2-methoxyethanesulfonate
2,4-dibromophenyl 2-ethoxyethanesulfonate
2,4-dibromophenyl 2-((2-hydroxy)ethoxy)ethanesulfonate
2,4-dichlorophenyl 2-((2-hydroxy)ethoxy)ethanesulfonate acetate
2,4-dichlorophenyl 2-((3-hydroxy)propoxy)ethanesulfonate acetate
2,4-dichlorophenyl 2-((4-hydroxy)butoxy)ethanesulfonate acetate
2,4-dibromophenyl 2-hydroxyethanesulfonate acetate
2,4-dibromophenyl 2-((2-hydroxy)ethoxy)ethanesulfonate acetate
2,4-dibromophenyl 2-((4-hydroxy)butoxy)ethanesulfonate acetate
2,4-dichlorophenyl 2-((1,3-dioxolan-2-ylethyl)oxy)ethanesulfonate
2,4-dichlorophenyl 2-((1,3-dioxolan-2-ylbutyl)oxy)ethanesulfonate
2,4-dibromophenyl 2-((1,3-dioxolan-2-ylmethyl)oxy)ethanesulfonate A preferred subclass of ethansulfonic acid derivatives according to the invention are those compounds of Formula I wherein R represents (a) methyl and ethyl, (b) acetyl, (c) 2-methoxyethyl, (d) hydrogen, (e) hydroxyethyl, or (f) allyl. Such compounds are preferred because of their activity as soil nematocides. Exemplary of such preferred compounds are:

2,4-dichlorophenyl 2-hydroxyethanesulfonate acetate
2,4-dichlorophenyl 2-methoxyethanesulfonate
2,4-dichlorophenyl 2-ethoxyethanesulfonate
2,4-dichlorophenyl 2-((2-hydroxy)ethoxy)ethanesulfonate
2,4-dichlorophenyl 2-allyloxyethanesulfonate
2,4-dibromophenyl 2-methoxyethanesulfonate
2,4-dibromophenyl 2-hydroxyethanesulfonate
4-bromo-2-chlorophenyl 2-((2-hydroxy)ethoxy)ethanesulfonate
2-bromo-4-chlorophenyl 2-((2-hydroxy)ethoxy)ethanesulfonate
2-bromo-4-chlorophenyl 2-allyloxyethanesulfonate
4-bromo-2-chlorophenyl 2-((2-methoxy)ethoxy)ethanesulfonate Preferred because of their outstanding nematocidal effectiveness and long-lasting effects in the soil are those esters of ethanesulfonic acid represented by the formula:

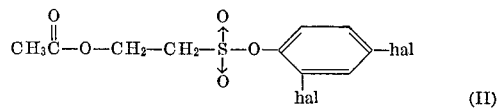

wherein each hal is the same and is either chlorine or bromine. Thus, 2,4-dichlorophenyl 2-hydroxyethanesulfonate acetate and 2,4-dibromophenyl 2-hydroxyethanesulfonate acetate are members of such a preferred subclass.

Also preferred because of their residual nematocidal effectiveness in soil are the members of the subclass represented by the formula:

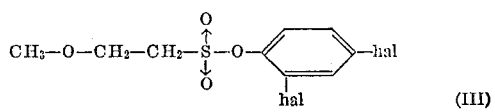

wherein each hal is the same and is either chlorine or bromine. Members of this subclass are 2,4-dichlorophenyl 2-methoxyethanesulfonate and 2,4-dibromophenyl 2-methoxyethanesulfonate.

Some of the 2,4- mixed dihalophenyl esters of ethanesulfonic acid are effective when used as seed-treating agents for the control of soilborne nematodes which attack the root system of plants. Such compounds are effective when employed as seed treating agents coated upon the seed prior to planting or may be applied to the seed by soaking the seed in solutions or suspension containing the nematocidally active ester. Examples of such active mixed dihalo esters include:

4-bromo-2-chlorophenyl 2-methoxyethanesulfonate
4-bromo-2-chlorophenyl 2-(2-methoxyethoxy)-ethanesulfonate The compounds of the invention are readily prepared by the reaction of the appropriate 2,4-dihalophenol with the appropriate alkanesulfonyl chloride in the presence of an acid acceptor such as triethylamine. The alkanoyl compounds, for example, are prepared by the reaction of a 2,4-dihalophenol and an appropriate ethanesulfonyl halide in the presence of triethylamine. The alkoxy compounds are readily prepared from the 2,4-dihalophenyl ethenesulfonate by the addition of appropriate alcohol in the presence of a catalytic amount of the corresponding alkoxide. The ester intermediates are synthesized from the appropriate 2,4-dihalophenol and a 2-chloroethanesulfonyl halide.

Preparation of the ethenesulfonate is carried out in liquid phase. Suitable reaction solvents include ether, methanol, ethanol, methylene chloride, benzene, hexane and the like. Suitable solvents for the liquid phase reaction to prepare the alkoxyethanesulfonates include ether, dioxane, dimethoxyethane and the alcohol corresponding to the alkoxy group being added.

The reaction is generally initiated at temperatures below ambient room temperature. Temperatures between 0° C. and 20° C. are preferred but it may be advantageous to employ temperatures as low as −10° C. Suitably the temperature may be permitted to rise gradually to about 25° C. by the exothermicity of the reaction. Pressure conditions of the reaction are not critical and the preparation of the compounds of the invention is suitably conducted at atmospheric pressures. However, superatmospheric or subatmospheric pressure may be employed in certain circumstances.

The reaction product may be conveniently separated from the reaction mixture in good yield by extraction, distillation and/or crystallization techniques.

The following examples of preparation and nematocidal activity of selected members of compounds of the invention are presented by way of illustration and are not to be construed as limiting the invention. Unless otherwise noted parts given are parts by weight.

EXAMPLE I: Preparation of 2,4-dichlorophenyl 2-hydroxyethanesulfonate acetate

A solution of 266.2 parts of 2,4-dichlorophenol and 167.4 parts of triethylamine in 470 parts of ether was added to a solution of 281 parts of isethionyl chloride acetate in 1050 parts of ether at 10–20° C. The addition was carried out over a 1½ hour period, after which the reactants were stirred for over 2 hours, then filtered and the filtrate was washed and dried over sodium sulfate. The product was stripped, reprecipitated, and twice recrystallized to yield 283 parts, 58% of theory, melting point 31–32° C. Structure confirmed by elemental analysis.

Calculated for $SO_4Cl_2C_{10}H_{10}$: Cl percent/w. 33.7; acid elem., g./equiv. 78.2. Found: Cl percent/w. 22.9; acid elem., g./equiv. 79.6.

Example II: Preparation of 2,4-dichlorophenyl ethenesulfonate

A solution of 358.6 parts of a 2,4-dichlorophenol and 222.2 parts of triethylamine in 800 parts of ether was added to 358.6 parts of 2-chloroethanesulfonyl chloride in 2000 parts of ether. Then 222.2 parts more triethylamine was added. 416 parts of 2,4-dichlorophenyl ethenesulfonate was distilled off boiling at 127–129° C. (0.3 torr.) (75% yield). Structure established by elemental analysis.

Calculated for $SO_3Cl_2C_8H_6$: Cl percent/w. 28.1; acid elem., g./equiv. 63.2. Found: Cl percent/w. 28.2; acid elem., g./equiv. 63.8.

EXAMPLE III: Preparation of 2,4-dichlorophenyl 2-methoxyethanesulfonate

A solution containing 5 parts of sodium methoxide in 200 parts of methanol was added at 0–10° C. to a solution of 405 parts of 2,4-dichlorophenyl ethenesulfonate, as prepared in Example II, in 200 parts of methanol. The mixture was stirred until reaction was complete and then quenched with 6.5 parts of acetic acid. The solution was washed with water and the organic layer dried over sodium sulfate. Distillation gave 421 parts of the desired product (92% yield) with a boiling point range of 145–155° C. (0.2 torr.). Structure confirmed by elemental analysis.

Calculated for $SO_4Cl_2C_9H_{10}$: Cl, percent/w. 24.9; acid elem., g./equiv. 71.2. Found: Cl, percent/w. 25.1; acid elem., g./equiv. 73.0.

EXAMPLE IV

The compounds of the invention were thoroughly mixed with soil infested with the root-knot nematode, *Meloidogyne incognita* (Var. *acrita*). All tests were made in replicates. In addition two-quart jars of untreated soil served as controls. The samples of soil were held at 80° F. for two weeks, then were transferred to 4-inch plant pots and seeded with tomatoes. Tomatoes are excellent indicator plants for evaluation of the presence of root-knot nematodes in the soil. After four weeks, the soil was washed from the roots of the plants and the number of root-knot galls, as evidence of the feeding of nematodes, was visually ascertained by experienced observers. The dosages used and the control of nematodes obtained at each dosage of each of the test compounds are set out in Table I.

TABLE I.—CONTROL OF ROOT-KNOT NEMATODES

| Compounds | Dosage, gms./qt. | Percent control |
|---|---|---|
| 2,4-dichlorophenyl 2-hydroxyethane sulfonate acetate | 0.001 | 100 |
| 2,4-dichlorophenyl 2-methoxy ethanesulfonate | 0.001 | 100 |
| 2,4-dichlorophenyl 2-((1,3-dioxolan-2-ylmethyl)oxy)-ethanesulfonate | 0.002 | 100 |
| 2,4-dichlorophenyl 2-(2-(methoxy)ethoxy)ethanesulfonate | 0.001 | 87 |
| 2,4-dichlorophenyl 2-((2-hydroxy)ethoxy)ethanesulfonate | 0.001 | 100 |
| 2,4-dibromophenyl 2-hydroxyethanesulfonate acetate | 0.002 | 90 |
| 2,4-dichlorophenyl 2-hydroxyethanesulfonate | 0.001 | 100 |
| 2,4-dichlorophenyl 2-allyloxyethanesulfonate | 0.001 | 91 |
| 2,4-dichlorophenyl 2-ethoxyethanesulfonate | 0.001 | 91 |
| 4-bromo-2-chlorophenyl 2-hydroxyethanesulfonate acetate | .002 | 88 |
| 4-bromo-2-chlorophenyl 2-((2-hydroxy)ethoxy) ethanesulfonate | 0.001 | 82 |
| 4-bromo-2-chlorophenyl 2-methoxyethanesulfonate | 0.001 | 86 |
| 4-bromo-2-chlorophenyl 2-(2-(methoxy)ethoxy) ethanesulfonate | 0.001 | 95 |
| 2-bromo-4-chlorophenyl 2-allyloxyethanesulfonate | 0.001 | 80 |

It is apparent that this new class of dihalophenyl sulfonates exhibit excellent properties for the control of root parasitic nematodes. These compounds are residual in the soil—that is, they are not excessively volatile, nor do they rapidly leach through the soil, and nor do they decompose readily. While these compounds are toxic to noxious nematodes, they do not appear to adversely affect growing plants and seed germination. This property permits the application of these compounds to the soil prior to planting, at planting, or to the soil adjacent to the growing plant.

Compounds of the invention vary in their water solubility. By selection of a more soluble member of the class, it is possible to control nematodes which attack plants with deep root systems. Increased water solubility has been found to be a property which may permit more efficient movement of the compound in the soil to render its toxic effects over a wider sphere.

Thus, 2,4-dihalophenyl sulfonates of the invention have been found to be effective killers of soil-dwelling nematodes—that is, the unsegmented roundworms of the class Nematoda, also known as eelworms, which customarily inhabit soil and feed upon the roots of plants growing therein. Included are the cyst forming nematodes of the genus Heterodera, the stubby root nematodes of the genus Trichodorus, the bulb and stem nematodes of the genus Ditylenchus, the golden nematode (*Heterodera rostochiensis*), the root knot nematodes of the genus Meloidogyne, the root-lesion nematodes of the genus Pratylenchus, the citrus nematodes of the genus Tylenchulus, and the plant-parasitic nematodes of such genera Naccobus, Radopholus, and the like.

These sulfonates are employed for the destruction of nematodes in soil by disseminating the sulfonates in the nematode-infested soil, to provide the necessary concentration of the sulfonates in the soil. Judging by the experimental work which has been performed, the nematocidally effective concentrations of these sulfonates in the soil lie within the range of from about 1 to about 100 parts per million, on a weight basis based on the weight of the air-dry soil, with the usual dosage ranging from about 4 to about 20 parts per million, on the same basis. As a practical matter, the effective dosage generally amounts to from about 1 to about 100 pounds of the nematocide per acre of land, depending upon the depth of soil to be treated, which may be up to 6, or 8, or even 12 inches, depending upon the particular species of plants and nematodes involved. Generally, dosages of from about 2 to about 40 pounds of the nematocide per acre of land are preferred.

The sulfonates of the invention may be dissolved in a suitable liquid diluent and the solution applied to and mixed with the soil, or the sulfonates may be formulated with a suitable solid carrier and applied as a dust, powder or as granules to the soil and admixed therewith. By the use of suitable emulsifying and dispersing agents the sulfonates can be emulsified or dispersed in water and the emulsion applied to the soil to be treated to provide effective control of the nematodes therein. Any of the usual emulsifying and dispersing agents commonly employed in forming aqueous emulsions and suspensions of water-insoluble materials can be used for this purpose. Generally but a small concentration of the emulsifying agent is required, as little as 0.05 percent of the weight of the final formulation being effective in many cases, while seldom will more than about 10% of the weight of the final formulation be required. Usually, the concentration of the emulsifying or dispersing agent will be from about 0.5 to about 5 percent of the weight of the formulation. Alternatively, or in addition, in some cases it may be of advantage to dissolve the sulfonate or sulfonates to be used in a solvent which can readily be dispersed in water to produce a heterogeneous dispersion of the nematocide in the water.

Where the sulfonate nematocide is to be applied as a solution, suitable solvents include alcohols, ketones and hydrocarbons, such as, for example, isopropyl alcohol, benzene, acetone, methyl ethyl ketone, secondary butyl alcohol, kerosene, chlorinated hydrocarbons, various nonphytotoxic hydrocarbon fractions which are ordinarily used in disseminating agricultural chemicals, including spray oils, horticultural oils, and the like.

The suitable solid carriers ordinarily are those which are essentially inert in the soil and which are not hygroscopic—for it they are hygroscopic the final formulation will not remain dry and free-flowing. In some cases, however, it may be desirable to employ as carrier a solid which is not inert—as, for example, a solid fertilizer such as a commercial mixed solid fertilizer, rock phosphate, urea or the like. Suitable inert carriers are those well known to the art including the clays such as the kaolinites, the bentonites and the attapulgites; other minerals in natural state such as talc, pyrophyllite, quartz, diatomaceous earth, fuller's earth, chalk, rock phosphate and sulfur; and chemically modified minerals, such as acid washed bentonites, precipitated calcium phosphates, precipitated calcium carbonate and colloidal silica. These diluents may represent a substantial portion, for example, 50 to 98 percent by weight of the entire formulation.

The solid formulations can be prepared by dissolving the nematocide in a suitable solvent, such as a volatile solvent, impregnating and/or coating the carrier particles with the solution and if necessary, removing the solvent. Granular formulations can be prepared by impregnating and/or coating granules of the carrier with the nematocide or by forming granules of mixtures of the nematocide and carrier.

From the standpoint of mechanics, the nematocide, neat or as a formulation, is applied to the soil in any manner which enables its intimate admixture with the soil to be treated. Thus the nematocide, which includes formulations thereof, can be applied to the surface of the soil, or it can be applied below the surface of the soil, and then admixed with the soil. If in the form of a liquid formulation, the nematocide can be drenched onto the surface of the soil or injected into the soil. In other words, conventional means, well known in the art, can be used to effect intimate admixture of the nematocide with the soil to be treated.

The 2,4-dihalophenyl sulfonates are characterized by a very extended effective life in the soil and essentially no phytotoxicity at the nematocidally effective dosages. Consequently, it may not in all cases be necessary to treat the entire mass of nematode-infested soil—in some cases it may be sufficient to treat only the soil of the rhizosphere of the plants to be protected. Thus, the soil immediately surrounding the roots of established trees can be treated to protect the trees, and row crops can be protected by treating only the soil which will surround the roots of the plants in each before the seeds or plants are planted, or after the plants have been planted. The formulations of the nematocides can also contain other materials, such as insecticides, fungicides, nematocides of different action and/or different physical characteristics, hormones, and/or fertilizers, to form multipurpose compositions.

I claim as my invention:
1. A compound of the formula:

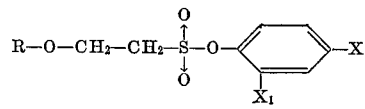

wherein R is a member of the group consisting of hydrogen, alkyl of from one to six carbon atoms, alkenyl of up to six carbon atoms, hydroxyalkyl of from one to six carbon atoms, alkanoyl of from two to six carbon atoms, alkoxyalkyl of from two to six carbon atoms, or unsubstituted dixolanylalkyl wherein the alkyl is 1 to 4 carbon atoms; and each X and $X_1$ is independently selected from the group consisting of chlorine, bromine, and fluorine.

2. A compound of the formula:

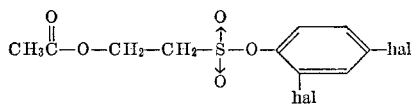

wherein each hal is the same and is selected from the group consisting of chlorine and bromine.

3. 2,4 - dichlorophenyl 2 - hydroxyethanesulfonate acetate.

4. A compound of the formula:

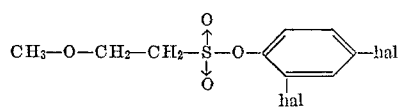

wherein each hal is the same and is selected from the group consisting of chlorine and bromine.

5. 2,4-dichlorophenyl 2-methoxyethanesulfonate.
6. 2,4-dichlorophenyl 2-hydroxyethanesulfonate.
7. 2,4-dichlorophenyl 2-allyloxyethanesulfonate.
8. A nematocidal composition consisting of:
(a) a compound of the formula:

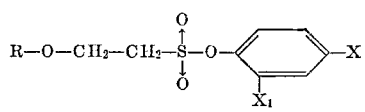

wherein R is a member of the group consisting of hydrogen, alkyl of from one to six carbon atoms, alkenyl of up to six carbon atoms, hydroxyalkyl of from one to six carbon atoms, alkanoyl of from two to six carbon atoms, alkoxyalkyl of from two to six carbon atoms, or unsubstituted dioxolanylalkyl wherein the alkyl is 1 to 4 carbon atoms; and each X and $X_1$ is independently selected from the group consisting of chlorine, bromine and fluorine.

(b) a suitable inert horticultural diluent therefor.

9. A method for combatting soil-borne nematodes which comprises introducing into nematode-infested soil an effective dosage of a compound of the formula:

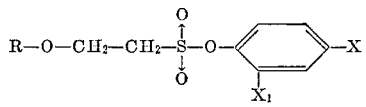

wherein R is a member of the group consisting of hydrogen, alkyl of from one to six carbon atoms, alkenyl of up to six carbon atoms, hydroxyalkyl of from one to six carbon atoms, alkanoyl of from two to six carbon atoms, alkoxyalkyl of from two to six carbon atoms, or unsubstituted dioxolanylalkyl wherein the alkyl is 1 to 4 carbon atoms; and each X and $X_1$ is independently selected from the group consisting of chlorine, bromine and fluorine.

References Cited
UNITED STATES PATENTS 3,346,613 10/1967 Larson et al. _____ 260—456
3,228,827 1/1966 Larson et al. _____ 167—30

LEWIS GOTTS, *Primary Examiner.*

S. K. ROSE, *Assistant Examiner.*